US012771111B2

(12) United States Patent
Mitra et al.

(10) Patent No.: US 12,771,111 B2
(45) Date of Patent: Oct. 20, 2026

(54) CIRCUIT BREAKERS AND CIRCUIT BREAKER OPERATIONAL METHODS

(71) Applicant: Battelle Memorial Institute, Richland, WA (US)

(72) Inventors: Bhaskar Mitra, Cambridge, MA (US); Nimat Shamim, Tumwater, WA (US); Sheik Mohammad Mohiuddin, Richland, WA (US); Manisha Maharjan, Princeton, NJ (US); Ahmad Tbaileh, Seattle, WA (US); Quan H. Nguyen, Richland, WA (US); Jinho Kim, Auburn, AL (US); Nader A. Samaan, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 169 days.

(21) Appl. No.: 18/537,542

(22) Filed: Dec. 12, 2023

(65) Prior Publication Data

US 2024/0195166 A1 Jun. 13, 2024

Related U.S. Application Data

(60) Provisional application No. 63/432,151, filed on Dec. 13, 2022.

(51) Int. Cl.
*H02H 3/02* (2006.01)
*H02H 3/08* (2006.01)

(52) U.S. Cl.
CPC ............ *H02H 3/021* (2013.01); *H02H 3/025* (2013.01); *H02H 3/083* (2013.01)

(58) Field of Classification Search
CPC ........ H02H 3/021; H02H 3/025; H02H 3/083; H02H 3/08; H01H 9/548; H01H 9/541; H01H 9/542; H01H 9/56; H01H 2009/543

(Continued)

(56) References Cited

U.S. PATENT DOCUMENTS 8,837,093 B2 9/2014 Panousis et al.
8,891,209 B2 * 11/2014 Hafner .................. H01H 9/541 361/13

(Continued)

FOREIGN PATENT DOCUMENTS

EP 2523204 A1 * 11/2012 ........... H01H 33/596
EP 3051643 A1 * 8/2016 ............... H02H 1/04

(Continued)

OTHER PUBLICATIONS

Al-Tameemi et al., "A Dual VSG-Based M3C Control Scheme for Frequency Regulation Support of a Remote AC Grid Via Low-Frequency AC Transmission System", IEEE Access vol. 8, 2020, United States, pp. 66085-66094.

(Continued)

*Primary Examiner* — Dharti H Patel
(74) *Attorney, Agent, or Firm* — Wells St. John P.S.

(57) ABSTRACT

Circuit breakers and associated methods are described. According to one aspect, a circuit breaker includes an input node configured to receive an AC waveform of electrical energy, an output node configured to output the AC waveform, mechanical breaker circuitry configured to selectively operate in a conductive state to conduct the AC waveform from the input node to the output node, switching circuitry configured to selectively operate in a conductive state to conduct the AC waveform from the input node to the output node, energy absorption circuitry coupled with the input node and the output node, wherein the mechanical breaker circuitry and the switching circuitry are changed from the conductive state to a non-conductive state after detection of a fault, and wherein the energy absorption circuitry is configured to dissipate electrical energy of the fault after the mechanical breaker circuitry and the switching circuitry are changed to the non-conductive state.

34 Claims, 15 Drawing Sheets

(58) Field of Classification Search
USPC ........................................................ 361/2
See application file for complete search history.

(56) References Cited

U.S. PATENT DOCUMENTS

| | | | | |
|---|---|---|---|---|
| 9,263,880 | B2 | 2/2016 | Komatsu et al. | |
| 9,646,795 | B2 | 5/2017 | Komatsu et al. | |
| 11,070,045 | B1 * | 7/2021 | Li | H02H 3/207 |
| 11,646,575 | B2 * | 5/2023 | Li | H02H 9/04 361/2 |
| 11,791,617 | B2 * | 10/2023 | Yang | H01H 33/596 361/118 |
| 2009/0296298 | A1 * | 12/2009 | Divan | H02H 9/001 361/58 |
| 2015/0022928 | A1 | 1/2015 | Mohaddes Khorassani | |
| 2015/0222111 | A1 * | 8/2015 | Magnusson | H01H 9/541 361/91.5 |
| 2015/0280421 | A1 * | 10/2015 | Niwa | H01H 33/596 361/91.1 |
| 2018/0041021 | A1 | 2/2018 | Backman et al. | |
| 2020/0058454 | A1 * | 2/2020 | Askan | H02H 3/025 |
| 2020/0185163 | A1 * | 6/2020 | Askan | H01H 9/542 |
| 2020/0194195 | A1 * | 6/2020 | Askan | H01H 9/548 |
| 2020/0365345 | A1 | 11/2020 | Telefus et al. | |
| 2020/0365346 | A1 | 11/2020 | Telefus et al. | |
| 2020/0365356 | A1 | 11/2020 | Telefus et al. | |
| 2020/0366078 | A1 | 11/2020 | Telefus et al. | |
| 2020/0366079 | A1 * | 11/2020 | Telefus | H02H 3/08 |
| 2020/0366089 | A1 * | 11/2020 | Schork | H02H 3/02 |
| 2021/0091561 | A1 * | 3/2021 | Schierling | H01B 3/20 |
| 2022/0189721 | A1 | 6/2022 | Telefus et al. | |
| 2023/0162937 | A1 | 5/2023 | Telefus et al. | |
| 2023/0170683 | A1 * | 6/2023 | Steurer | H01H 33/596 361/101 |
| 2023/0198248 | A1 * | 6/2023 | Qi | H02H 9/025 361/93.9 |
| 2023/0420928 | A1 | 12/2023 | Meng et al. | |
| 2025/0104954 | A1 * | 3/2025 | Lu | G01R 31/3275 |

FOREIGN PATENT DOCUMENTS

| | | | | |
|---|---|---|---|---|
| EP | 3059827 | | 8/2016 | |
| EP | 3229252 | A1 * | 10/2017 | H01H 33/59 |
| WO | WO-2013071980 | A1 * | 5/2013 | H01H 9/541 |
| WO | WO-2013093066 | A1 * | 6/2013 | H02H 3/08 |
| WO | WO 2022/116043 | | 6/2022 | |
| WO | WO PCT/US2023/083675 | | 6/2025 | |

OTHER PUBLICATIONS

Al-Tameemi et al., "A Novel Control Scheme for Multi-Terminal Low-Frequency AC Electrical Energy Transmission Systems Using Modular Multilevel Matrix Converters and Virtual Synchronous Generator Concept", Energies vol. 13, No. 3, 2020, Switzerland, 19 pages.

Athay et al., "A Practical Method for the Direct Analysis of Transient Stability", IEEE Transactions on Power Apparatus and Systems vol. PAS-98, No. 2, 1979, United States, pp. 573-584.

Azad et al., "A Fast Local Bus Current-Based Primary Relaying Algorithm for HVDC Grids", IEEE Transactions on Power Delivery vol. 32, No. 1, 2017, United States, pp. 193-202.

Barnes et al., "HVDC Circuit Breakers—A Review", IEEE Access vol. 8, 2020, United States, pp. 211829-211848.

Cairoli et al., "High Current Solid State Circuit Breaker for DC Shipboard Power Systems", IEEE, 2019, United States, pp. 468-476.

Callavik et al., "The Hybrid HVDC Breaker", ABB Grid Systems Technical Paper vol. 361, Nov. 2012, Sweden, pp. 143-152.

Canelhas et al., "A Low Frequency Power Collector Alternative System for Long Cable Offshore Wind Generation", 11th IET International Conference on AC and DC Power Transmission, 2015, United Kingdom, pp. 1-6.

Ceballos et al., "Analysis of Voltage Balancing Limits in Modular Multilevel Converters", 37th Annual Conference of the IEEE Industrial Electronics Society (IECON), 2011, United States, pp. 4397-4402.

Chen et al., "Low-Frequency AC Transmission for Offshore Wind Power", IEEE Transactions on Power Delivery vol. 28, No. 4, 2013, United States, pp. 2236-2244.

Dakic et al., "Low Frequency AC Transmission Systems for Offshore Wind Power Plants: Design, Optimization and Comparison to High Voltage AC and High Voltage DC", International Journal of Electrical Power Energy Systems vol. 133, Dec. 2021, United Kingdom, 12 pages.

Dong et al., "Provision of Ancillary Services by Renewable Hybrid Generation in Low Frequency AC Systems to the Grid", International Journal of Electrical Power Energy Systems vol. 105, 2019, United Kingdom, pp. 775-784.

Du et al., "A Current Limiting Control Strategy for Single-Loop Droop-Controlled Grid-Forming Inverters under Balanced and Unbalanced Faults", IEEE Energy Conversion Congress & Exposition (ECCE), 2022, United States, 7 pages.

Du et al., "A Comparative Study of Two Widely Used Grid-Forming Droop Controls on Microgrid Small Signal Stability", IEEE Transactions of Emerging and Selected Topics in Power Electronics vol. 8, No. 2, 2020, United States, pp. 963-975.

Du et al., "Modeling of Grid-Forming and Grid-Following Inverters for Dynamic Simulation of Large-Scale Distribution Systems", IEEE Transactions on Power Delivery vol. 36, No. 4, 2021, United States, pp. 2035-2045.

Du et al., "Survivability of Autonomous Microgrid During Overload Events", IEEE Transactions on Smart Grid vol. 10, No. 4, 2019, United States, pp. 3515-3524.

Electranix Corporation, "E-Tran Plus User Guide", Technical Report, Nov. 2016, Winnipeg, MB, Canada, available online at https://descargas.indielec.com/web/E-TRAN_Chap9_ Theory.pdf, 15 pages.

EPRI, "Model User Guide for Generic Renewable Energy System Models", Product ID 3002027129 available online at https://www.epri.com/research/products/000000003002027129, Oct. 10, 2023, 90 pages.

Eriksson et al., "Small Scale Transmission to AC Networks by HVDC Light", 12th Cepsi Conference, Nov. 1998, Thailand, 8 pages.

Franck, "HVDC Circuit Breakers: A Review Identifying Future Research Needs", IEEE Transactions on Power Delivery vol. 26, No. 2, 2011, United States, pp. 998-1007.

Funaki et al., "Feasibility of the Low Frequency AC Transmission", IEEE Power Engineering Society Winter Meeting Conference Proceedings (Cat. No. 00CH37077) vol. 4, 2000, United States, pp. 2693-2698.

Ghaderi et al., "High Impedance Fault Detection: A Review", Electric Power Systems Research vol. 143, 2017, Netherlands, pp. 376-388,.

Hariri et al., "A Hybrid Simulation Tool for the Study of PV Integration Impacts on Distribution Networks", IEEE Transactions on Sustainable Energy vol. 8, No. 2, 2016, United States, pp. 648-657.

Lao et al., "Power Electronic Converters for Low-Frequency HVAC Transmission: Functions and Challenges", IEEE Power Energy Society General Meeting (PESGM), 2018, United States, pp. 1-5.

Ludin et al., "Solid-State DC Circuit Breakers and Their Comparison in Modular Multilevel Converter Based-HVDC Transmission System", Electronics vol. 10, 2021, Switzerland, 22 pages.

Ma et al., "Modular Multilevel Matrix Converter for Offshore Low Frequency AC Transmission System", IEEE 26th International Symposium on Industrial Electronics (ISIE), 2017, United States, pp. 768-774.

Maruf et al., "Hybrid High Voltage AC/DC System for Interfacing Off-Shore Power Generations with On-Shore Grid", IEEE SoutheastCon, 2016, United States, pp. 1-2.

Meere et al., "Variable AC Transmission Frequencies for Offshore Wind Farm Interconnection", Renewable Energy vol. 103, 2017, United Kingdom, pp. 321-332.

(56) References Cited

OTHER PUBLICATIONS

Mitra et al., "Protection Coordination for Assembly HVDC Breakers for HVDC Multiterminal Grids Using Wavelet Transform", IEEE Systems Journal vol. 14, No. 1, 2019, United States, pp. 1069-1079.
Mitra et al., "Adaptive Threshold-Based Zonal Isolation of Faults in a Multiterminal DC Using Local Measurements", IEEE Systems Journal vol. 16, No. 1, 2021, United States, pp. 209-218.
Mitra et al., "Comparative Analysis of Hybrid DC Breaker and Assembly HVDC Breaker", IEEE North American Power Symposium (NAPS), 2017, United States, 6 pages.
Mitra et al., "HVDC Transmission for Access to Off-Shore Renewable Energy: A Review of Technology and Fault Detection Techniques", IET Renewable Power Generation vol. 12, No. 13, 2018, United Kingdom, pp. 1563-1571.
Mitra et al., U.S. Appl. No. 63/432,151, filed Dec. 13, 2022 titled "IGBT Based Low-Frequency Circuit Breaker", 103 pages.
Miura et al., "Modular Multilevel Matrix Converter for Low Frequency AC Transmission", IEEE 10th International Conference on Power Electronics and Drive Systems (PEDS), 2013, United States, pp. 1079-1084.
Mohammadi et al., "HVDC Circuit Breakers: A Comprehensive Review", IEEE Transactions on Power Electronics vol. 36, No. 12, 2021, United States, pp. 13726-13739.
Mohiuddin et al., "Optimal Distributed Control of AC Microgrids with Coordinated Voltage Regulation and Reactive Power Sharing", IEEE Transactions on Smart Grid vol. 13, No. 3, 2022, United States, pp. 1789-1800.
Musial et al., "Offshore Wind Market Report: 2022 Edition", U.S. Department of Energy, 2022, United States, 126 pages.
Ngo et al., "Steady-State Analysis and Performance of Low Frequency AC Transmission Lines", IEEE Transactions on Power Systems vol. 31, No. 5, Sep. 2016, United States, pp. 3873-3880.
Ngo et al., "Study of Low Frequency AC Transmission for Wind Turbine Applications", IEEE Power Energy Society General Meeting (PESGM), 2018, United States, pp. 1-5.
Ngo et al., "Voltage Stability of Low Frequency AC Transmission Systems", IEEE/PES Transmission and Distribution Conference and Exposition, 2016, United States, pp. 1-5.
Nguyen et al., "Loss Minimization with Optimal Power Dispatch in Multi-Frequency HVAC Power Systems", IEEE Transactions on Power Systems vol. 35, No. 3, 2020, United States, pp. 1979-1989.
Nguyen et al., "Optimal Planning and Operation of Multi-Frequency HVAC Transmission Systems", IEEE Transactions on Power Systems vol. 36, No. 1, 2021, United States, pp. 689-698.
Nguyen et al., "Power Flow in a Multifrequency HVAC and HVDC System: Formulation, Solution, and Validation", IEEE Transactions on Power Systems vol. 34, No. 4, 2019, United States, pp. 2487-2497.
NYPA Press Release, "New York Power Authority to Pursue $1.5 Million in New Technology Solutions to Improve Energy Efficiency and Reduce Costs in New York's Power Infrastructure", available online at https://nypa.gov/news/press-releases/2019/20190815-energy-efficiency, Aug. 15, 2019, 7 pages.
Olsen et al., "Low Frequency AC Transmission on Large Scale Offshore Wind Power Plants—Achieving the Best from Two Worlds?", 13th Workshop on Wind Power Integration, Nov. 2014, Germany, 6 pages.
PowerWorld, "Plant Controller Model", available online at https://www.powerworld.com/WebHelp/Content/TransientModels_HTML/Plant%20Controller%20REPC_A.htm, 2024, 3 pages.
PowerWorld, "Renewable Energy Electrical Control Model", available online at https://web.archive.org/web/20220901051305/https://www.powerworld.com/WebHelp/Content/TransientModels_HTML/Exciter%20REEC_A.htm, Sep. 2022, 2 pages.
PowerWorld, "Renewable Energy Generator/Converter", available online at https://www.powerworld.com/WebHelp/Content/TransientModels_HTML/Machine%20Model%20REGC_A.htm, 2024, 2 pages.
Qin et al., "Offshore Wind Farm Connection with Low Frequency AC Transmission Technology", IEEE Power Energy Society General Meeting, 2009, United States, pp. 1-8.
Raza et al., "HVDC Circuit Breakers: Prospects and Challenges", Applied Sciences vol. 11, No. 11, 2021, Switzerland, 21 pages.
Reid, "PC37.01TM/D02 Draft Standard for Standard for High Voltage Direct Current Circuit Breakers Above 3200 Vdc", IEEE Draft WGDS vol. C37.30.7, Mar. 2022, United States, 63 pages.
Rosewater et al., "Optimal Field Voltage and Energy Storage Control for Stabilizing Synchronous Generators on Flexible AC Transmission Systems", IEEE/PES Transmission and Distribution Conference and Exposition, 2018, United States, pp. 1-5.
Ruddy et al., "A Comparison of VSC-HVDC with Low Frequency AC for Offshore Wind Farm Design and Interconnection", Energy Procedia vol. 80, 2015, United Kingdom, pp. 185-192.
Ruddy et al., "Low Frequency AC Transmission for Offshore Wind Power: A Review", Renewable and Sustainable Energy Reviews vol. 56, 2016, United Kingdom, pp. 75-86.
Russell, "ScottishPower Renewables Investigates Low Frequency Transmission for EA3", available onlinet at https://www.4coffshore.com/news/scottishpower-renewablesinvestigates-low-frequency-transmission-for-ea3-nid4661.html, Oct. 10, 2016, 3 pages.
Sehloff et al., "Low Frequency AC Transmission Upgrades with Optimal Frequency Selection", IEEE Transactions on Power Systems vol. 37, No. 2, 2022, United States, pp. 1437-1448.
Sehloff et al., "Steady State Modeling for Variable Frequency AC Power Flow", 52nd North American Power Symposium (NAPS), 2021, United States, pp. 1-6.
Sneath et al., "Fault Detection and Interruption in an Earthed HVDC Grid Using ROCOV and Hybrid DC Breakers", IEEE Transactions on Power Delivery vol. 31, No. 3, Jun. 2016, United States, pp. 973-981.
Suonan et al., "Distance Protection for HVDC Transmission Lines Considering Frequency-Dependent Parameters", IEEE Transactions on Power Delivery vol. 28, No. 2, 2013, United States, pp. 723-732.
Tang et al., "DRU Based Low Frequency AC Transmission Scheme for Offshore Wind Farm Integration", IEEE Transactions on Sustainable Energy vol. 12, No. 3, 2021, United States, pp. 1512-1524.
Walton, "NYPA Board of Trustees Approves Northern New York Priority Transmission Project Plan", available online at https://www.utilitydive.com/news/nypa-approves-transmission-line-rebuild-targeting-447m-in-annual-savings/597618/, Mar. 31, 2021, 3 pages.
WETO, "Offshore Wind Research and Development", available online at https://www.energy.gov/eere/wind/offshore-wind-research-and-development, Dec. 9, 2022, 7 pages.
White House, "Fact sheet: President Biden Sets 2030 Greenhouse Gas Pollution Reduction Target Aimed at Creating Good-Paying Union Jobs and Securing U.S. Leadership on Clean Energy Technologies", available online at https://www.whitehouse.gov/briefing-room/statements-releases/2021/04/22/fact-sheet-president-biden-sets-2030-greenhouse-gas-pollution-reduction-target-aimed-at- creating-good-paying-union-jobs-and-securing-u-s-leadership-on-clean-energy-technologies/, Apr. 22, 2021, 6 pages.

* cited by examiner

CIRCUIT BREAKERS AND CIRCUIT BREAKER OPERATIONAL METHODS

RELATED PATENT DATA

This application claims the benefit of U.S. Provisional Patent Application Ser. No. 63/432,151, filed Dec. 13, 2022, titled "IGBT Based Low-Frequency Circuit Breaker," the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to circuit breakers and circuit breaker operational methods.

BACKGROUND OF THE DISCLOSURE

The US government has set a goal of reaching 100 percent carbon pollution-free electricity by 2035 and the Department of Energy (DOE) plans to deploy 30 GW and 110 GW of offshore wind generation of electrical energy by 2030 and 2050, respectively. Meeting such ambitious goals necessitates an integration of clean, renewable energy generation at the regional scale and a transmission infrastructure with sufficient capacity and flexibility to support bulk power flows across large geographical distances under different operating scenarios.

Two well established existing transmission technologies, including high-voltage alternating current (HVac) and high-voltage direct current (HVdc) including HVdc Light, have their own advantages and disadvantages.

For example, HVdc lines enjoy unparalleled advantages of low transmission losses and undiminished point-to-point long-distance transmission capacity. However, the complexity of the converter development and the lack of practical DC circuit breakers results in HVdc systems being utilized for low-redundancy point-to-point connection.

On the other hand, HVac transmission typically has a frequency within a range of 50 Hz-60 Hz and intrinsically offers flexible multi-terminal interconnection capability that forms today's interconnected AC grids. Further, short-circuit fault current protection and interruption are simple and fast to implement in HVac grids within the frequency range of 50 Hz-60 Hz. Unfortunately, the power transfer capability over long distances of HVac lines is substantially limited compared to that of HVdc lines, which limits the application of HVac in large-scale renewable integration from remote locations.

An alternative approach to large-scale offshore integration can be performed with emerging low-frequency high voltage ac (LF-HVac) transmission systems. LF-HVac systems serve as an economical alternative to HVdc systems for bulk power transmission. Under low-frequency transmission, the impedance of the transmission lines or cables is reduced compared with higher frequency systems that aids with increase of the power transfer capability of the system. Power transfer capabilities are almost comparable to HVdc systems under very low frequencies.

The development of multi-terminal HVdc networks for connecting offshore generation has been hindered by the lack of DC circuit breaker deployments and multi-stage converter deployments to establish HVdc terminals are costly and complex to implement.

The reduction of the system impedance via use of low-frequency transmission increases the magnitude of fault current. Low frequency systems have a longer wavelength, and thus it may take a longer time to clear a fault compared with systems of increased frequencies. For example, assuming a 60-Hz system can withstand a current of a fault for 3 cycles, the time to clear the fault is 0.05 seconds while it would take 0.3 seconds to clear a fault for a 10-Hz system. Allowing fault current to sustain for a longer period is detrimental and could lead to permanent damage of components of circuit breakers and/or the transmission system.

At least some aspects of the disclosure are directed towards circuit breaker apparatus and associated methods for use in alternating current (AC) electrical systems including low frequency high voltage AC (LF-HVac) electrical systems.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

At least some of the aspects disclosed herein are directed towards electrical circuit breakers and methods of interrupting faults that may occur in an electrical system. Some of the example embodiments described herein provide interruption of fault currents that occur in high-voltage alternating current (AC) electrical systems including low frequency high-voltage alternating current (LF-HVac) electrical systems. Low frequency high-voltage alternating current (LF-HVac) electrical systems operate at system frequencies that are less than 40 Hz and may be within a range of 10-15 Hz in some embodiments. Although illustrative embodiments of circuit breakers are discussed herein with respect to a single circuit breaker, the circuit breakers may be implemented in three-phase AC electrical systems with one circuit breaker being used for each phase.

Figure 1:
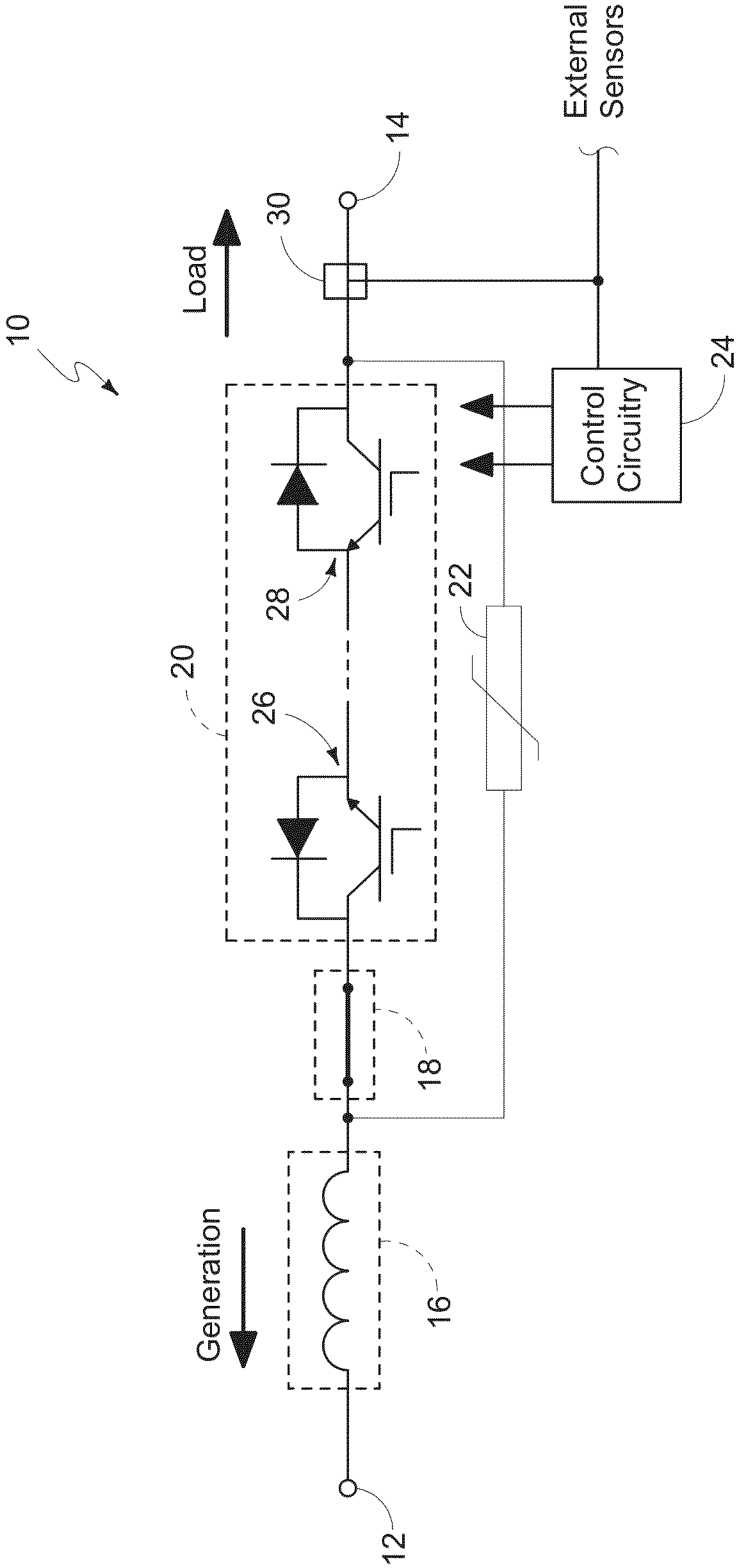
FIG. 1 is a high-level schematic representation of a circuit breaker according to a first embodiment.

Referring to FIG. 1, a circuit breaker 10 configured to interrupt fault currents within an AC electrical system is shown according to one embodiment. The depicted example circuit breaker 10 includes an input node 12, an output node 14, a fault current limiter 16, mechanical breaker circuitry 18, switching circuitry 20, energy absorption circuitry 22 and control circuitry 24. The input and output nodes 12, 14 of circuit breaker 10 are coupled with components of a single phase of a three-phase AC electrical system.

Input node 12 is configured to receive an alternating current (AC) waveform of electrical energy into the breaker 10. In an example implementation, the AC waveform is generated and outputted from a generation source of the AC electrical system, such as a windfarm. Other generation sources are possible, including other renewable generation sources, such as tidal generators, solar, and virtual power plants (VPPs) for example.

The output node 14 is configured to output the AC waveform that was received via input node 12 externally from the circuit breaker 10. The output node 14 may output the AC waveform to an appropriate load, such as a high-voltage alternating current (HVac) electrical system. In a more specific example, the AC waveform outputted from the breaker 10 may have a relatively low frequency as mentioned above and the AC waveform may be outputted from the output node 14 and applied to a converter (not shown) to increase the frequency of the AC waveform and thereafter to a transformer to increase the voltage of the AC waveform for application to a high-voltage alternating current electrical system (HVac) or grid that may include transmission and distribution circuits for transmitting and distributing AC electrical energy to a plurality of loads at an increased frequency (e.g., 60 Hz mains power in the United States or 50 Hz mains power in Europe).

Fault current limiter 16 is configured to reduce stress on downstream components of circuit breaker 10 in the presence of a fault by limiting a rate of change of current. The fault current limiter 16 may act as a high impedance to limit high fault currents to a reduced level. In normal operation during the absence of a fault, fault current limiter 16 has almost no impedance and is relatively invisible to the electrical system. In the presence of a fault, fault current limiter 16 switches from a conductive state to a highly resistive state that limits conduction of current of the fault to downstream components of the circuit breaker 10.

In the illustrated embodiment of FIG. 1, mechanical breaker circuitry 18 and switching circuitry 20 are coupled in series with one another and are provided in a first branch between the input and output nodes 12, 14 of the circuit breaker 10. Energy absorption circuitry 22 is coupled in parallel with the mechanical breaker circuitry 18 and switching circuitry 20 and is considered to be in a second branch between the input and output nodes 12, 14 of the circuit breaker 10.

The circuit breaker 10 additionally includes control circuitry 24 and one or more sensors 30 although one sensor 30 is shown in the example FIG. 1. Sensors 30 are coupled with control circuitry 24 and are each configured to monitor and provide information regarding one or more conditions of electrical energy (e.g., current and voltage) being conducted within the electrical system. The sensors 30 may be provided internally at different locations of the circuit breaker 10 and externally of the input and output nodes 12, 14.

Control circuitry 24 is arranged to process received data and issue commands and may comprise one or more processor(s) and/or other structure configured to execute executable instructions in an example embodiment. Control circuitry 24 is configured to receive and process data from the sensor(s) 30 to detect the presence of a fault within the AC electrical system in which the circuit breaker 10 is implemented in one embodiment. The described embodiment of the control circuitry 24 controls or changes operations of each of mechanical breaker circuitry 18 and switching circuitry 20 between non-conducting/open and conducting/closed states of operation in the presence of a fault. In the described embodiment, control circuitry 24 is configured to change each of the mechanical breaker circuitry 18 and the switching circuitry 20 from respective operations in conductive states to operations in non-conductive states to interrupt a fault. In some embodiments, control circuitry 24 is configured to change operation of the mechanical breaker circuitry 18 from a conductive state to a non-conductive state at a zero-crossing of the AC waveform being conducted between input and output nodes 12, 14 to reduce arcing that may otherwise occur during the opening of the mechanical breaker circuitry 18.

Mechanical breaker circuitry 18 is provided within a first branch of the circuit breaker 10 and is coupled with input and output nodes 12, 14. Mechanical breaker circuitry 18 may be selectively controlled at different times to operate in one of a conductive/closed state of operation and a non-conductive/open state of operation. Mechanical breaker circuitry 18 has a physical electrical connection that is typically closed providing the mechanical breaker circuitry 18 in a conductive state during normal operation of the circuit breaker 10 and in the absence of a fault in the circuit breaker 10 and associated AC electrical system. Mechanical breaker circuitry 18 operating in the conductive/closed state of operation conducts the AC waveform between input and output nodes 12, 14 with relatively low loss. In one embodiment, control system 24 controls the mechanical breaker circuitry 18 to change from the conductive/closed state of operation to a non-conductive/open state of operation after detection of a fault within the AC electrical system. As discussed further below, mechanical breaker circuitry 18 is controlled by control circuitry 24 to assist with interruption of a current of the fault being conducted through the mechanical breaker circuitry 18 by being opened to break the physical electrical connection of the mechanical breaker circuitry 18 after detection of the fault.

Switching circuitry 20 includes plural switching devices 26, 28 to implement bi-direction operation of circuit breaker 10. In particular, although embodiments disclosed herein conduct electrical energy received via input node 12 to output node 14, the circuit breaker 10 may also conduct electrical energy in a reverse direction in other embodiments. Switching devices 26, 28 may each be implemented as a semiconductor switch in the form of a Insulated Gate Bipolar Transistor (IGBT) in a specific example embodiment. Semiconductor switches developed using Gallium Nitride (GaN) have higher efficiency compared to Silicon (Si) transistors as well as have increased power density and provide lower on-state resistance (RON). The switching devices 26, 28 are each configured to be controlled to be on (conductive) or off (non-conductive) responsive to control signals, such as gate signals, from control circuitry 24 in one embodiment.

In one embodiment, switching circuitry 20 (including both switching devices 26, 28) is controlled to operate in a closed/conductive state of operation during normal operations of circuit breaker 10 and in the absence of a fault within the circuit breaker 10 and associated AC electrical system. Switching circuitry 20 provided in the conductive/closed state of operation is configured to conduct received AC waveforms from the input node 12 to the output node 14 along with mechanical breaker circuitry 18. As discussed further below, switching circuitry 20 is controlled by control circuitry 24 to operate in an open/non-conducting state after detection of a fault within the AC electrical system.

Energy absorption circuitry 22 is coupled with input and output nodes 12, 14 and is in parallel with mechanical breaker circuitry 18 and switching circuitry 20. Energy absorption circuitry 22 is configured to absorb electrical energy within the circuit breaker 22 in the presence of a fault to interrupt the fault. In one embodiment, energy absorption circuitry 22 includes one or more absorption devices, such as metal oxide varistors (MOVs), that are each a voltage dependent, non-linear device that provides excellent transient voltage suppression. In one embodiment, energy absorption circuitry 22 operates to absorb and dissipate electrical energy of a fault present in the AC electrical system following changing of mechanical breaker circuitry 18 and switching circuitry 20 from conductive states of operation to non-conductive states of operation. A plurality of energy absorption devices of the circuitry 22 may be arranged in an arrester bank in some embodiments.

Referring to FIGS. 2A-2D, different stages of operation of the circuit breaker 10 including the mechanical breaker circuitry 18, switching circuitry 20, and energy absorption circuitry 24 of FIG. 1 are shown according to one embodiment. Active or conducting components and conductors are shown in bold while non-conducting components are not bolded in FIGS. 2A-2D.

Figure 2A:
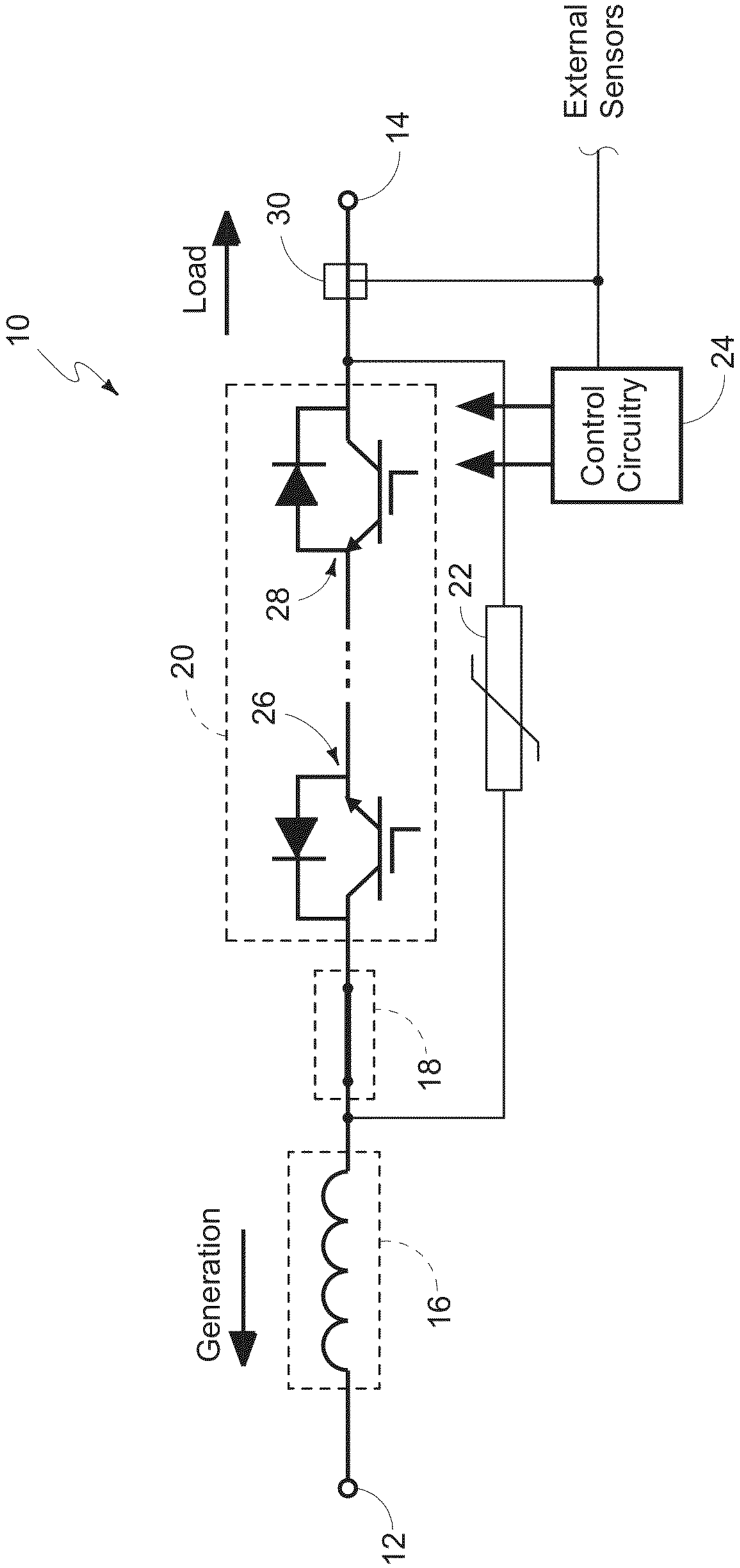
FIGS. 2A-2D are high-level schematic representations of stages of operation of the circuit breaker shown in FIG. 1.

In FIG. 2A, the mechanical breaker circuitry 18 and switching circuitry 20 are provided in closed or conducting states to conduct AC waveforms from input node 12 to output node 14.

Figure 2B:
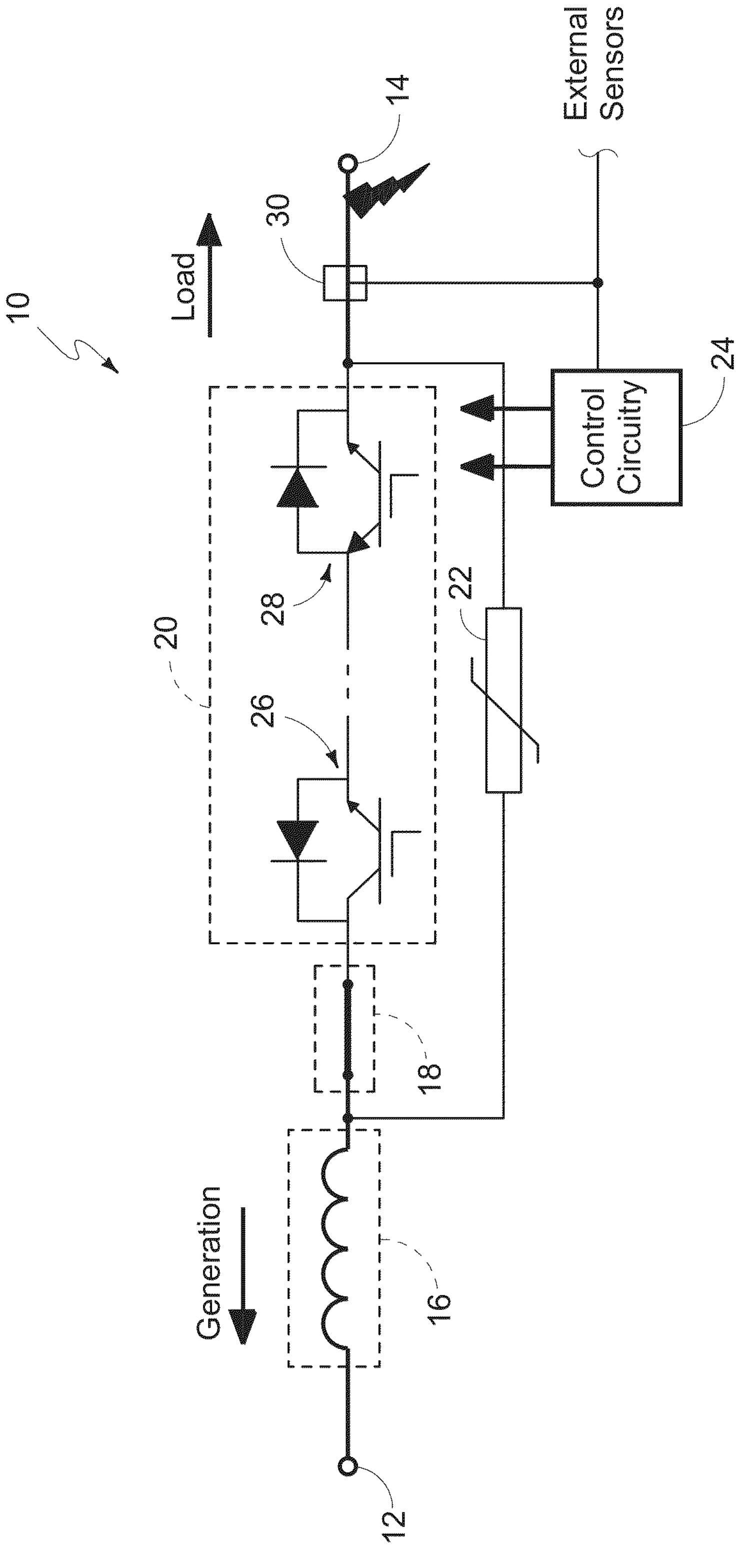

In FIG. 2B, control circuitry 24 detects a fault by receiving outputs from one of the sensors. In one example, control circuitry 24 detects a fault current of excessive Amperage indicating the presence of a fault such as a short between different transmission lines of different phases or with ground in the load. Following detection of the fault, the control circuitry 24 commands the switching devices 26, 28 of the switching circuitry 20 to turn off or enter non-conducting/open states. The opening of the switching devices 26, 28 provides an initial interruption of the fault that creates an artificial zero-crossing for current flowing through mechanical breaker circuitry 18.

Figure 2C:
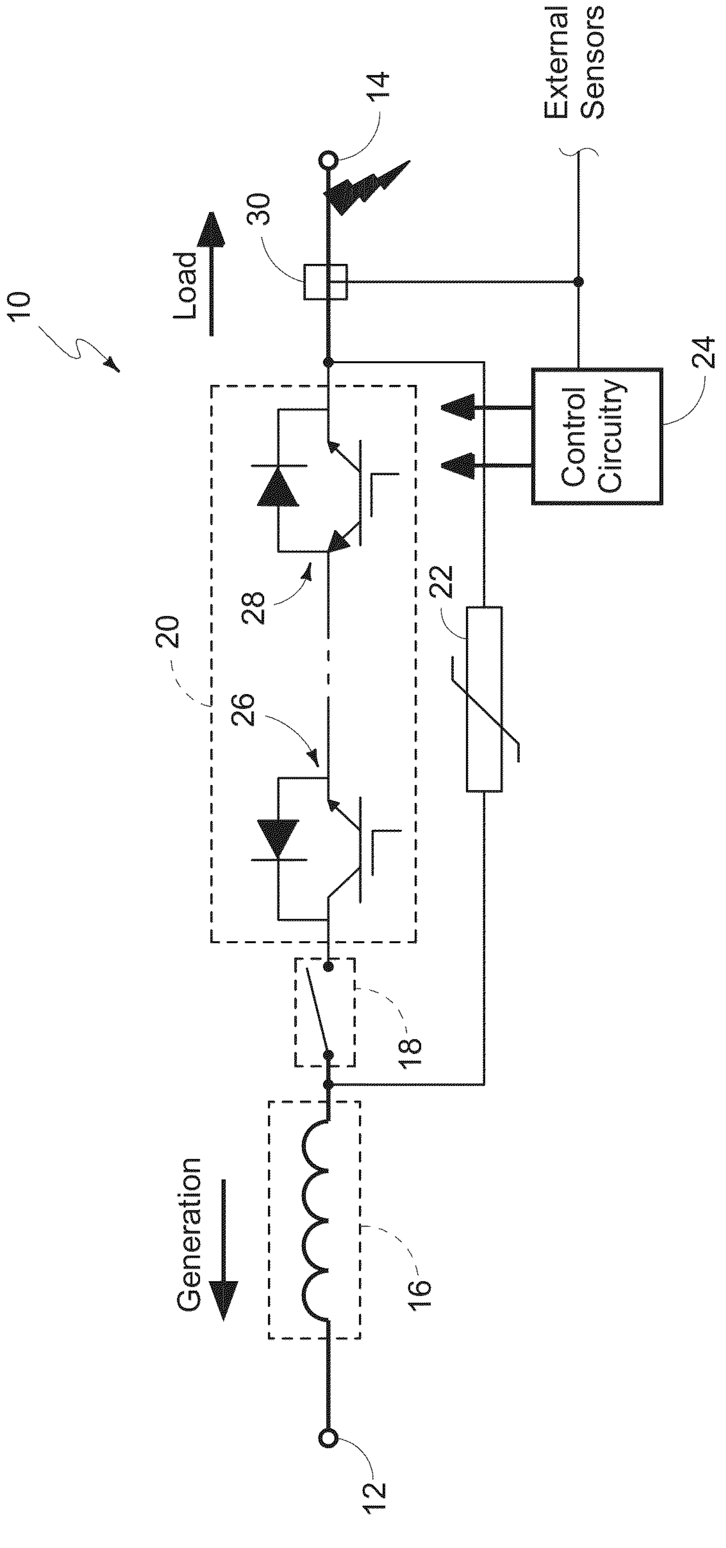

In FIG. 2C, the provision of an artificial current zero at the zero-crossing due to the switching devices 26, 28 turning off provides an opportunity for the operation of the mechanical breaker circuitry 18 to be changed to a non-conducting/open state with reduced arcing due to the zero-crossing compared with opening of the mechanical breaker circuitry 18 at times when current is flowing through the mechanical breaker circuitry 18 (i.e., at times other than a zero-crossing of the current). The ability to turn switching devices 26, 28 on and off increases the speed of interrupt compared to some implementations since an artificial zero-crossing may be created after detection of the fault to allow opening of mechanical breaker circuitry 18 and avoiding subjecting the circuit breaker 10 to additional cycles of the fault current.

Figure 2D:
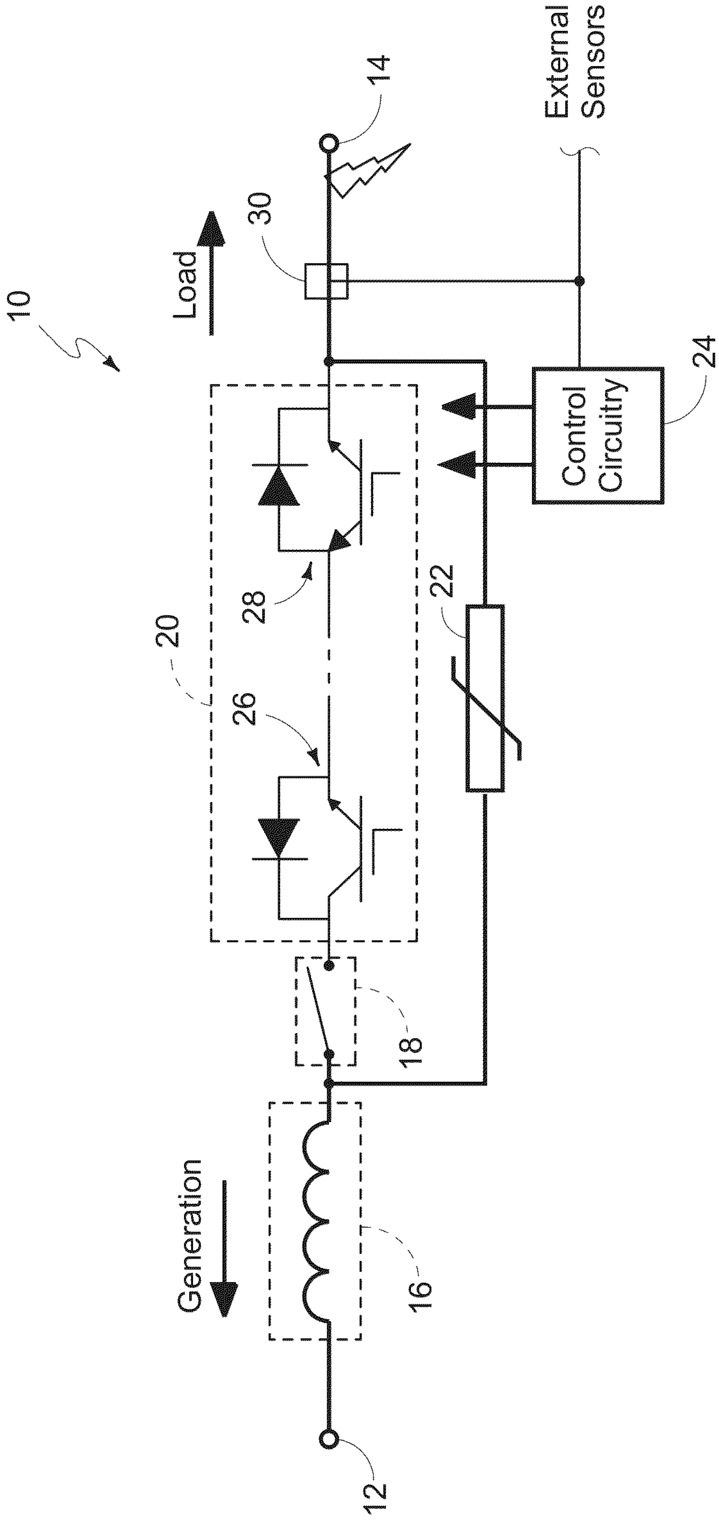

In FIG. 2D, after mechanical breaker circuitry 18 is provided in the non-conductive state, the energy absorption circuitry 22 absorbs excess electrical energy of the fault to provide interruption of the fault and to completely isolate the fault in the described embodiment.

More specifically, once the mechanical breaker circuitry 18 and switching circuitry 20 have been turned off and provided in non-conductive states, the magnitude of the fault voltage and current generated across the circuit breaker 10 is reduced and the residual voltage and current flow through the energy absorption circuitry 22. The operating voltage of the energy absorption circuitry 22 is set usually 15 to 25% above the operating voltage of the circuit breaker 10. When the voltage across the energy absorption circuitry 22 is less than a reference voltage, the energy absorption circuitry 22 operates as a resistor with infinite resistance.

After the opening of the mechanical breaker circuitry 18 and the switching circuitry 20, the energy absorption circuitry 22 absorbs excess energy of the fault. The current in the energy absorption circuitry 22 establishes a counter voltage across the circuit breaker 10 which reduces the current of the fault to zero by dissipating the energy of the fault. The resistive operation of the energy absorption circuitry 22 gradually reduces the current of the fault and the current is zero when the voltage of the energy absorption circuitry 22 is the same as the voltage of the circuit breaker 10. Accordingly, the energy absorption circuitry 22 absorbs excess energy when a fault is interrupted by opening mechanical breaker circuitry 18 and switching circuitry 20 connected in parallel with energy absorption circuitry 22.

Figure 4:
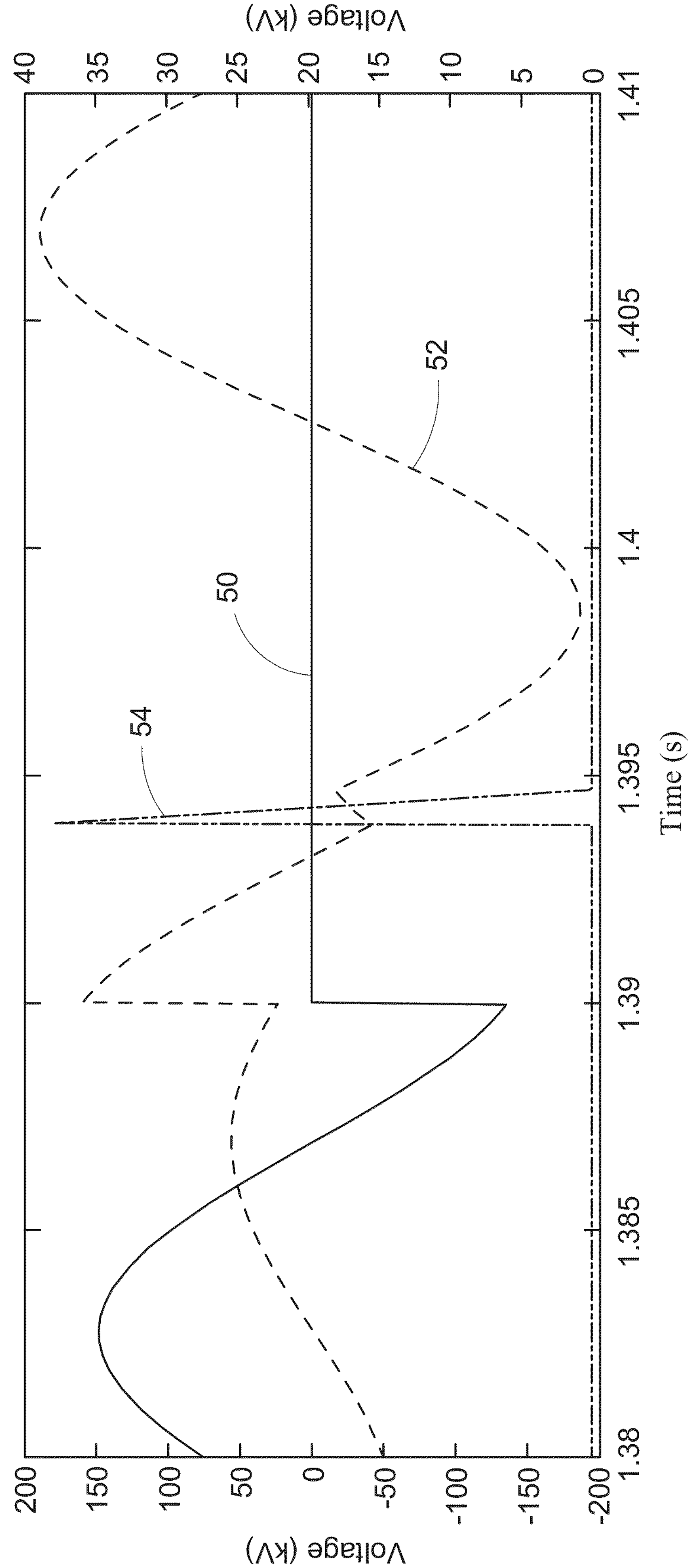
FIG. 4 is a timing diagram of voltage of an AC waveform and voltage and current of energy absorption circuitry of the circuit breaker shown in FIG. 1 in the presence of a fault.

The voltage characteristics of the energy absorption circuitry 22 during interruption of a fault are shown in FIG. 4 and described further below.

Figure 3:
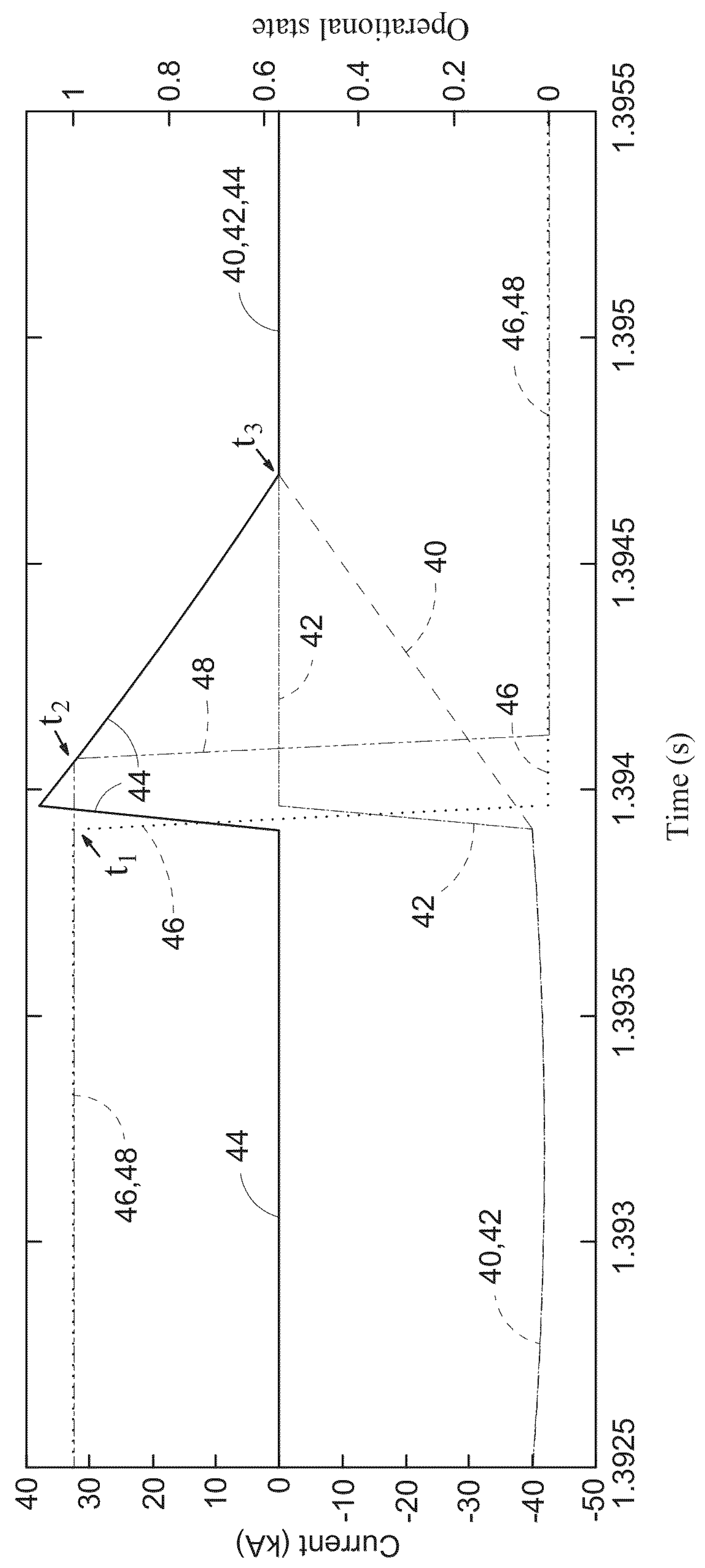
FIG. 3 is a timing diagram of operational characteristics of the circuit breaker shown in FIG. 1 in the presence of a fault.

Referring to FIG. 3, a timing diagram illustrating the operation of the circuit breaker 10 of FIG. 1 is shown.

The time $t_0$ that the fault occurs is previous in time and is not shown FIG. 3. The current of the AC waveform being conducted through the circuit breaker 10 is shown as reference line 40, the current conducted through the mechanical breaker circuitry 18 is shown as reference line 42, the current of the energy absorption circuitry 22 is shown as reference line 44, the state (i.e., "1" being conductive/closed and "0" being non-conductive/open) of the switching circuitry 20 is shown as reference line 46 and the state of the mechanical breaker circuitry 18 is shown as reference line 48.

Upon detection of a fault, the switching circuits 26, 28 of switching circuitry 20 are turned off at time $t_1$.

Upon sensing zero current through mechanical breaker circuitry 18 (via a sensor not shown), the control circuitry 24 instructs the mechanical breaker circuitry 18 to start to open to a non-conductive state at time $t_2$.

The energy absorption circuitry 22 begins to conduct current for fault interruption after time $t_1$ and the fault is interrupted or isolated at time $t_3$.

Referring to FIG. 4, a timing diagram illustrating the variation of voltage and current by the energy absorption circuitry 22 to interrupt the fault corresponding to FIG. 3 is shown. The voltage of the phase received by the circuit breaker 10 is shown as reference line 50, the voltage of the energy absorption circuitry is shown as reference line 52 and the current of the energy absorption circuitry is shown as reference line 54. The voltage of the phase of the AC waveform received by the circuit breaker 10 indicated by reference line 50 has a voltage in excess of 1,200 Volts at different moments in time as shown in FIG. 4.

Figure 5:
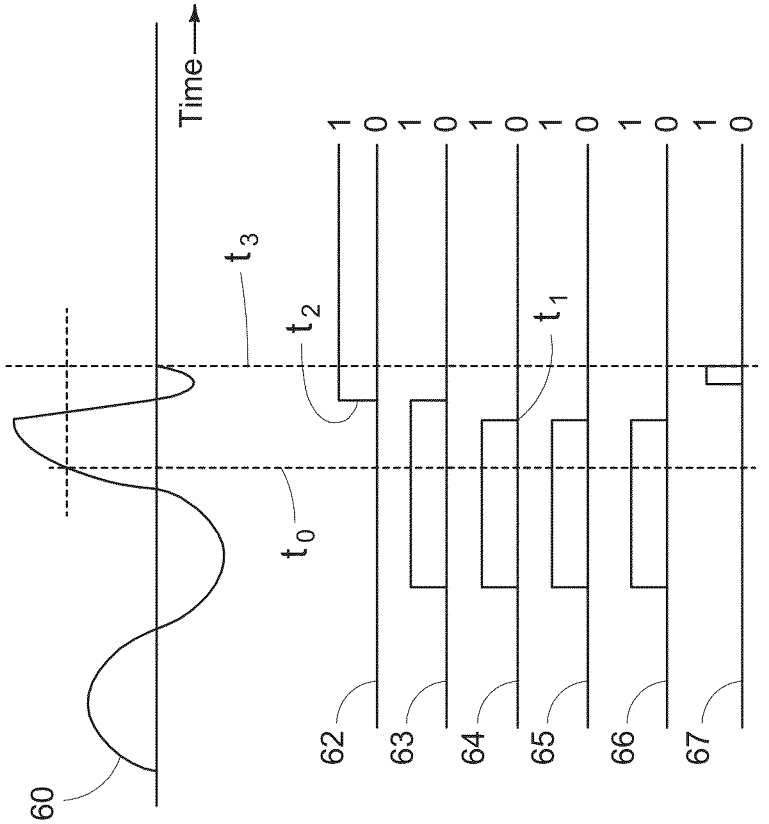
FIG. 5 is a timing diagram of an AC waveform being conducted using the circuit breaker shown in FIG. 1 in the presence of a fault and corresponding operational states of components of the circuit breaker.

Referring to FIG. 5, a timing diagram illustrating the AC waveform being conducted from the input node 12 to the output node 14 of the circuit breaker 10 and timing of operations of the circuit breaker 10 at moments in time $t_0$-$t_3$ described above are shown.

An AC waveform 60 is conducted through circuit breaker 10 and a fault is detected at time $t_0$.

Reference line 62 shows the timing of the provision of the mechanical breaker circuitry 18 in an open or non-conductive state (state 1) from a closed or conductive state (state 0) that begins at time $t_2$.

Reference line 63 shows the timing of the operation of the mechanical breaker circuitry 18 in the closed or conductive state (state 0).

Reference lines 64, 65 show the timing of assertion (state 1) of gate control signals from the control circuitry 24 to control the respective operations of switching devices 26, 28 in closed or conductive states (state 1) and the gate control signals are de-asserted (state 0) at time $t_1$ to provide the switching devices 24, 26 in open or non-conducive states (state 0).

Reference line 66 shows the timing of the operation of switching devices 26, 28 in closed or conductive states (state 1) and open or non-conductive states (state 0).

Reference line 67 shows the timing of the operation of the energy absorption circuitry 22 to absorb the excess energy (state 1). The interruption of the fault is shown at time $t_3$.

In the illustrated embodiment, the interruption time provided following the detection of a fault is reduced compared with other arrangements of circuit breakers by turning off the switching circuitry 20 to create an artificial zero-crossing of the AC waveform 60 allowing the mechanical breaker circuitry 18 to be opened to a non-conductive state in the presence of reduced current (i.e., substantially at the zero-crossing of the AC waveform 60) that reduces arcing across the mechanical breaker circuitry 18 that would otherwise occur if the mechanical breaker circuitry 18 were not opened at a zero-crossing of the AC waveform 60. Excess energy of the fault is absorbed by the energy absorption circuitry 22 following the opening of the mechanical breaker circuitry 18 and the artificial current zero induced by initially turning off the switching circuitry 20 allows the mechanical breaker circuitry 18 to operate slower than other arrangements of circuit breakers and the device rating of the mechanical breaker circuitry 18 may accordingly be lower compared with the other arrangements.

In the illustrated embodiment, the changing of each of the mechanical breaker circuitry 18 and the switching circuitry 20 to the respective non-conductive states and the dissipation of the electrical energy by the energy absorption circuitry 22 operate to interrupt the fault within one cycle of the AC waveform following detection of the fault.

Figure 6:
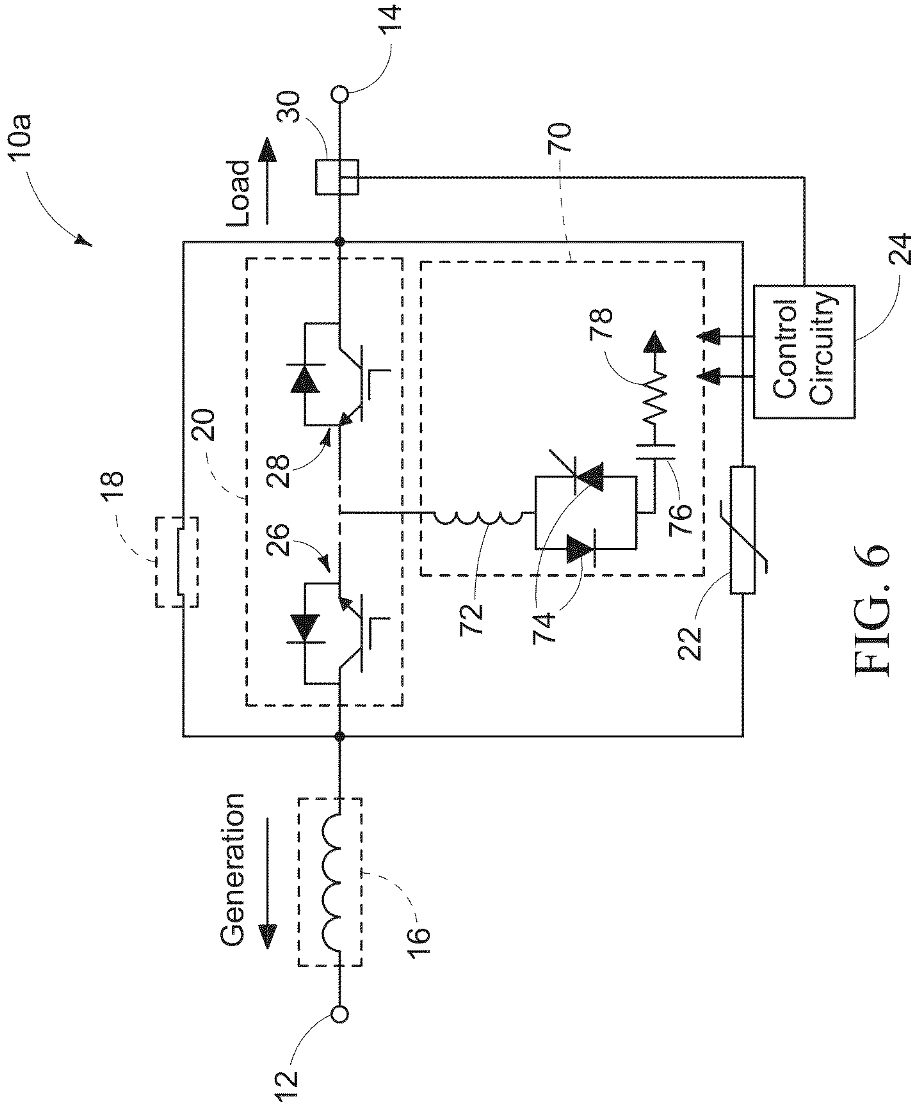
FIG. 6 is a high-level schematic representation of a circuit breaker according to a second embodiment.

A second embodiment of a circuit breaker 10*a* is shown in FIG. 6. In the illustrated embodiment, circuit breaker 10*a* includes fault current limiter 16, mechanical breaker circuitry 18, switching circuitry 20, energy absorption circuitry 22 and control circuitry 24 similar to FIG. 3. In the embodiment of FIG. 6, the mechanical breaker circuitry 18, switching circuitry 20 and energy absorption circuitry 22 are coupled in parallel with one another intermediate the input and output nodes 12, 14 and may be individually considered to be one of a plurality of different branches of the circuit breaker 10*a*.

Circuit breaker 10*a* additionally includes energy storage circuitry 70 in the depicted embodiment. Energy storage circuitry 70 is configured to store electrical energy and to discharge the electrical energy to switching circuitry 20 to reduce an amplitude of a fault current being conducted through the AC breaker 10*a* as discussed further below. The illustrated embodiment of storage circuitry 70 includes an inductor 72, plural diodes 74, a capacitor 76 and a resistor 78 intermediate the switching circuitry 20 and ground.

Referring to FIGS. 7A-7F, different stages of operation of the circuit breaker 10*a* including the mechanical breaker circuitry 18, switching circuitry 20, energy absorption circuitry 24 and energy storage circuitry 70 of FIG. 6 are shown according to one embodiment. Components and conductors in active/closed/conductive states are shown in bold while non-conducting components are not bolded in FIGS. 7A-7F.

Figure 7A:
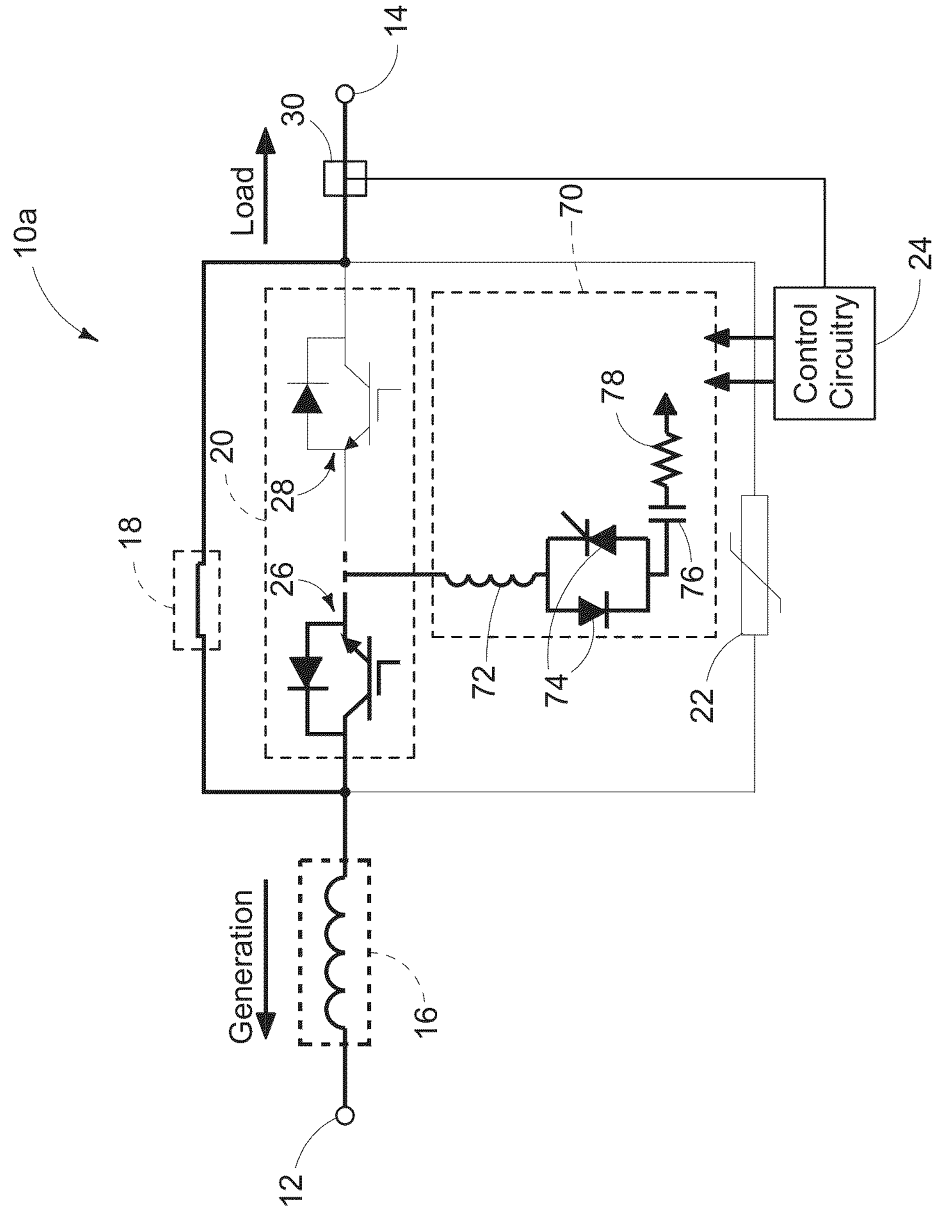
FIGS. 7A-7F are high-level schematic representations of stages of operation of the circuit breaker shown in FIG. 6.

Referring to FIG. 7A, normal operation of circuit breaker 10*a* in the absence of a fault is shown where the mechanical breaker circuitry 18 is in a closed/conductive state. Mechanical breaker circuitry 18 provides a path of least resistance and minimizes the on-state conduction losses during operation. In addition, energy storage circuitry 70 is charged by selectively turning on switching device 26.

Figure 7B:
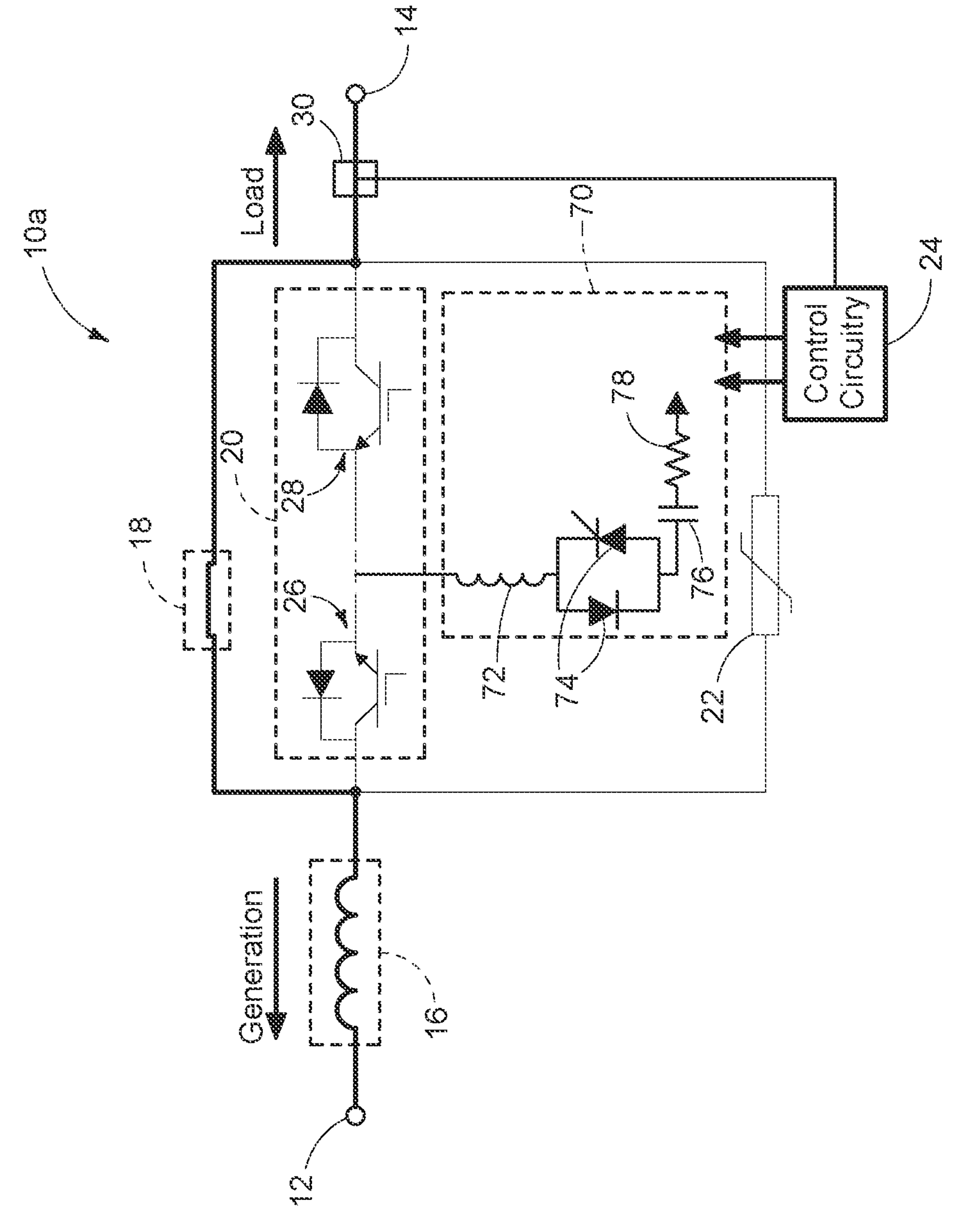

Referring to FIG. 7B, normal operation of circuit breaker 10*a* in the absence of a fault is shown where the mechanical breaker circuitry 18 is in a closed/conductive state and switching device 26 has been turned off following charging of energy storage circuitry 70 and monitoring of the charging by control circuitry 24.

Figure 7C:
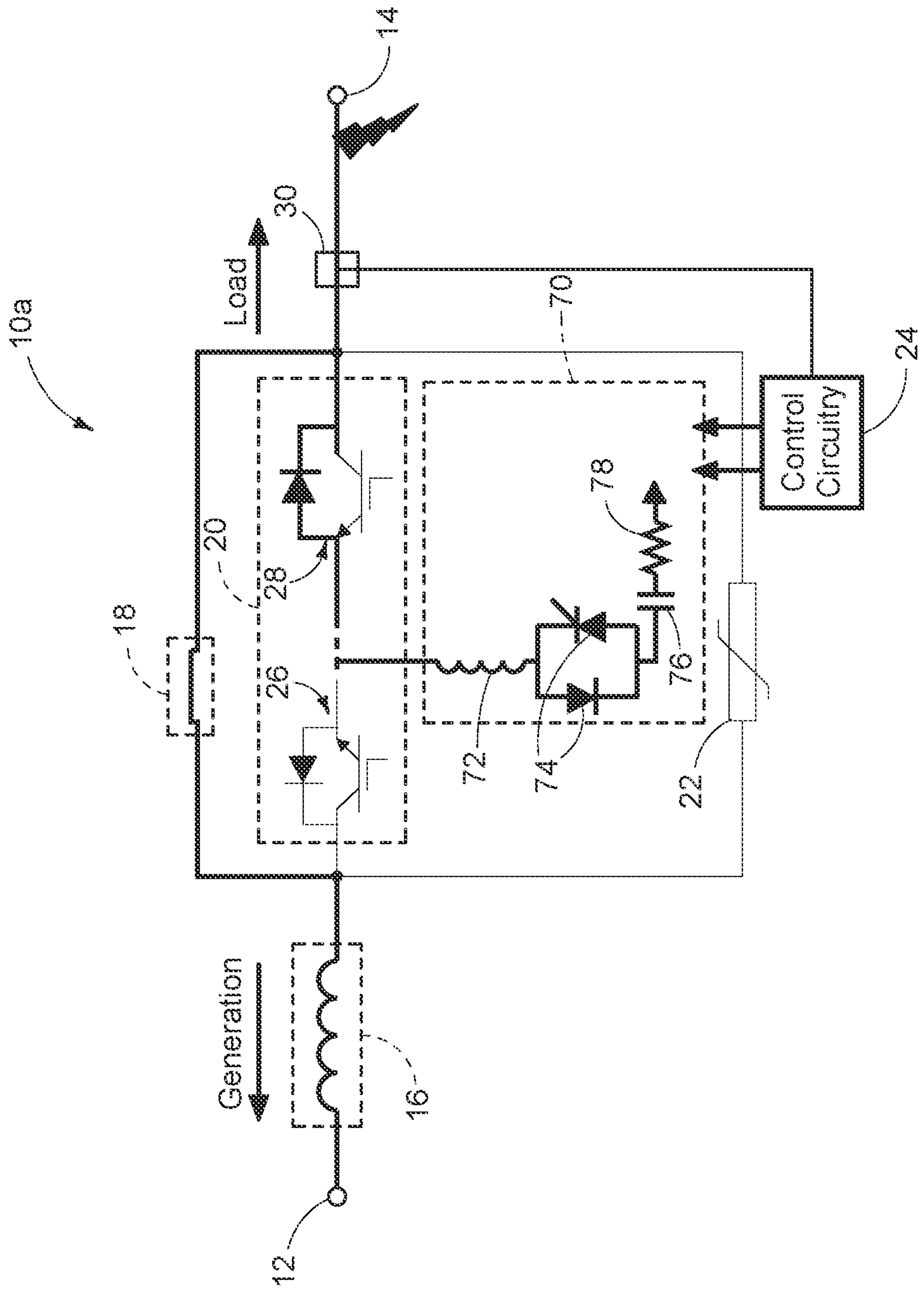

Referring to FIG. 7C, a fault condition (e.g., overvoltage or overcurrent) has been detected by one or more sensor of the electrical system. For example, a low impedance fault may be detected in the grid side coupled with the output node 14 of the circuit breaker 10*a* and the stored electrical energy is discharged to the low impedance fault. Upon detection of the fault, control circuitry 24 turns on switching device 28 to discharge the electrical energy stored within energy storage circuitry 70 and providing injection of current that is reverse or in opposition to the current of the fault to suppress the fault (e.g., the injected current may be approximately 180 degrees out of phase of the current of the fault).

In one specific embodiment, inductor 72 and capacitor 76 are coupled in series to form an LC oscillation circuit to generate an oscillating current of the electrical energy stored in circuitry 70 in the event of a fault that is reverse or in opposition to the current of the fault. The inherent characteristics of the LC circuit contribute to an increase in internal impedance, allowing for smooth transfer of current of the fault to the LC oscillation circuit. A gradually increasing oscillating current from the LC circuit assists in reducing current of the fault that reaches the mechanical breaker circuitry 18. The usage of the electrical energy stored within the energy storage circuitry 70 to suppress fault currents may allow components of lower electrical ratings to be used in the circuit breaker 10*a* compared with other arrangements.

Figure 7D:
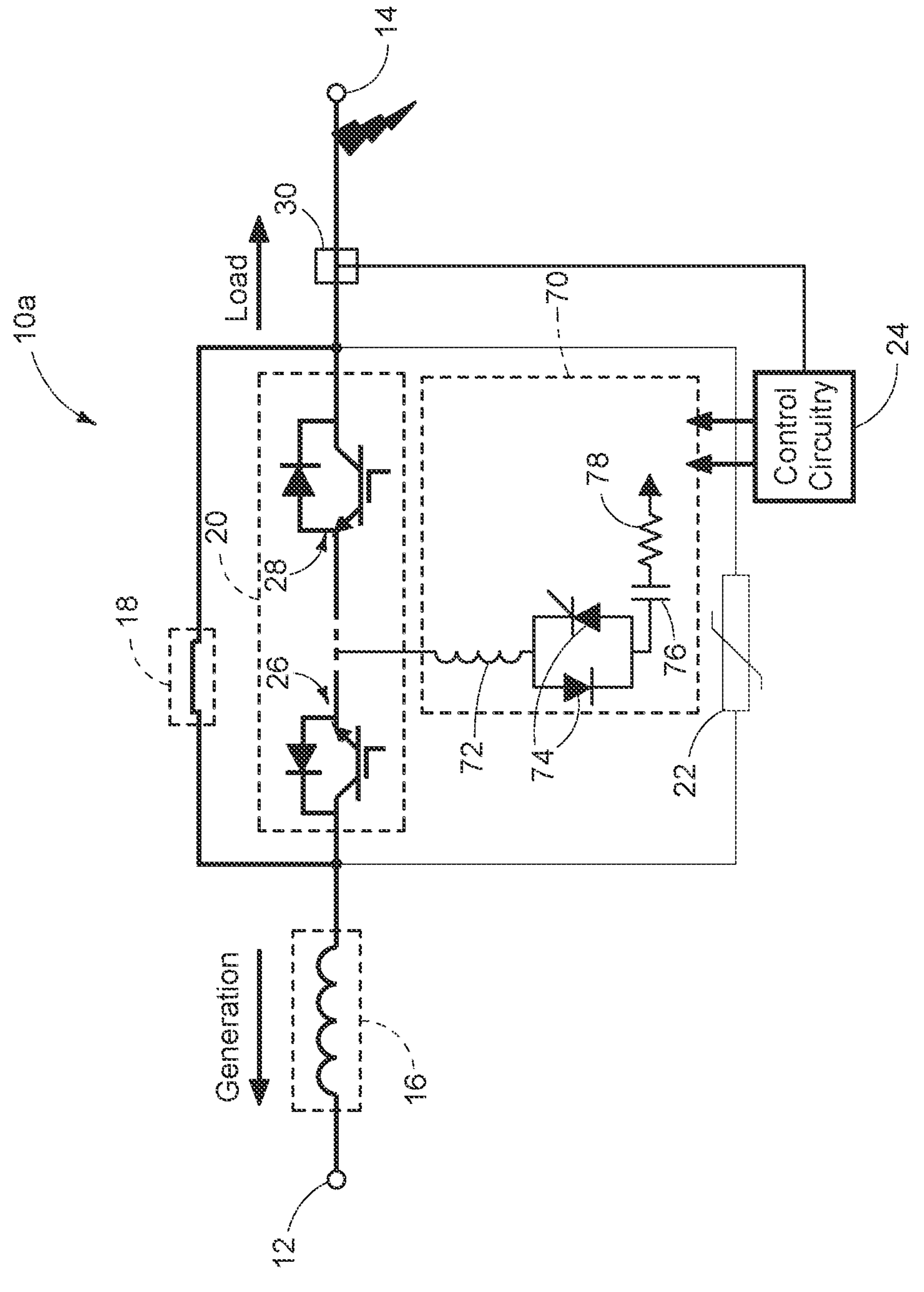

Referring to FIG. 7D, the control circuitry 24 monitors the voltage of the energy storage circuitry 70 to monitor the discharge of the electrical energy from the energy storage circuitry 70. Upon the voltage of the circuitry 70 dropping below a threshold, control circuitry 24 controls the switching devices 26, 28 to both enter closed/conductive states of operation to assist with conduction of the fault current through the circuit breaker 10*a* and reduction of the fault current conducted through the mechanical breaker circuitry 18.

Figure 7E:
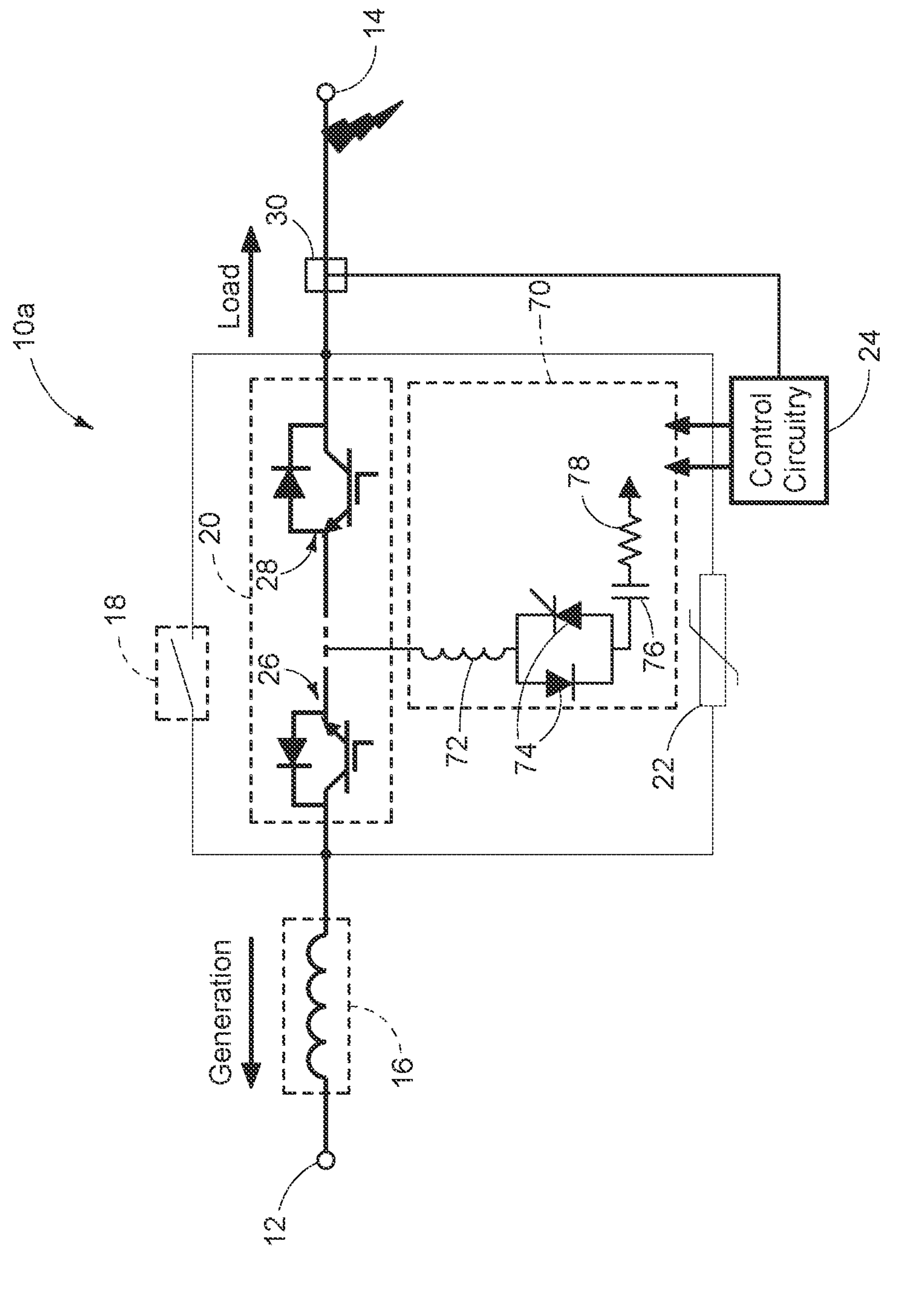

Referring to FIG. 7E, the mechanical breaker circuitry 18 is then commanded to physically open breaking its physical electrical conduction. In one embodiment, control circuitry 24 monitors via sensor 30 for the occurrence of a first zero-crossing of the conducted AC waveform following the detection of the fault and commands the mechanical breaker circuitry 18 to open at the point of zero-crossing of the AC waveform to reduce arcing within the mechanical breaker circuitry 18. The entire current of the fault flows through switching circuitry 20 following the opening of the mechanical breaker circuitry 18. The mechanical breaker circuitry 18 of the embodiment of FIG. 6 may have slower operation to change from a closed/conductive state to an open/non-conducting state compared with the mechanical breaker circuitry 18 of the embodiment of FIG. 1 since the energy storage security 70 and the switching circuitry 20 assist with interruption of the fault.

Figure 7F:
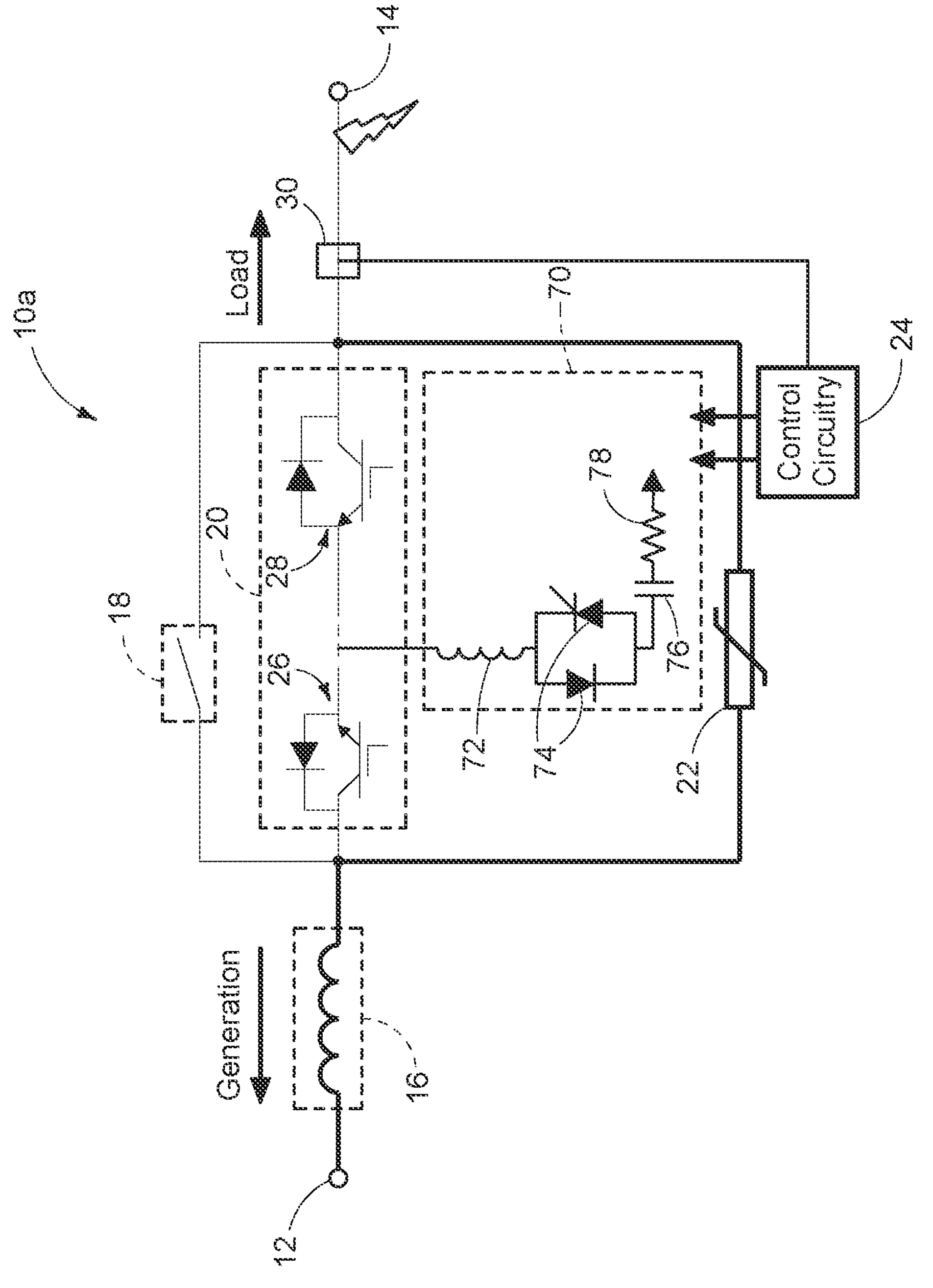

Referring to FIG. 7F, the control circuitry 24 monitors for zero current being conducted within the mechanical breaker circuitry 18 (i.e., indicative of the mechanical breaker circuitry 18 having achieved an open state) and controls the switching devices 26, 28 of the switching circuitry 20 to enter into open/non-conducting states to interrupt the fault current. Following the opening of the switching devices 26, 28, the fault current starts to decrease by commutating the current to the energy absorption circuitry 22. The energy absorption circuitry 22 reduces the fault current to zero by dissipating electrical energy of the fault. In one embodiment, the energy absorption circuitry 22 includes one or more MOV devices as discussed above.

One of the key aspects for enabling large-scale deployment of low-frequency high voltage AC (LF-HVac) transmission systems is protection. The low impedance of low-frequency networks gives rise to fault currents that are higher in magnitude as compared to conventional systems that utilize higher system frequencies of operation. Some existing AC circuit breakers are designed to operate at rated 50-Hz or 60-Hz frequencies and may not be fast enough to interrupt some fault currents of low frequency AC electrical systems. The use of circuit breakers described herein that can integrate with LF-HVac systems benefit the development and resiliency of the electrical grid. The example circuit breakers disclosed herein are configured to interrupt faults to avoid damage to the associated electrical system and assist in the seamless implementation and expansion of LF-HVac grids.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A circuit breaker comprising:

an input node configured to receive an AC waveform of electrical energy into the circuit breaker, wherein the AC waveform has a frequency less than 40 Hz;

an output node configured to output the AC waveform from the circuit breaker;

mechanical breaker circuitry coupled with the input node and the output node, and wherein the mechanical breaker circuitry is configured to selectively operate in a conductive state to conduct the AC waveform from the input node to the output node;

switching circuitry coupled with the input node and the output node, and wherein the switching circuitry is configured to selectively operate in a conductive state to conduct the AC waveform from the input node to the output node;

energy absorption circuitry coupled with the input node and the output node;

wherein the operations of the mechanical breaker circuitry and the switching circuitry are each changed from the conductive state to a non-conductive state after detection of a fault; and wherein the energy absorption circuitry is configured to dissipate electrical energy of the fault after the operations of the mechanical breaker circuitry and the switching circuitry are each changed to the non-conductive state.

2. The circuit breaker of claim 1 wherein the AC waveform has a frequency within a range of 10-15 Hz.

3. The circuit breaker of claim 1 further comprising control circuitry configured to change operation of the mechanical breaker circuitry to a non-conductive state at a zero-crossing of the AC waveform.

4. The circuit breaker of claim 3 wherein the control circuitry is configured to change operation of the switching circuitry from a conductive state into a non-conductive state to provide the zero-crossing of the AC waveform.

5. The circuit breaker of claim 1 further comprising energy storage circuitry configured to store electrical energy and to discharge the stored electrical energy to the switching circuitry to reduce an amplitude of a current of the fault.

6. The circuit breaker of claim 1 wherein the mechanical breaker circuitry and the switching circuitry are coupled in series with one another between the input node and the output node.

7. The circuit breaker of claim 6 further comprising control circuitry configured to change the operation of the switching circuitry from the conductive state to the non-conductive state and to change the operation of the mechanical breaker circuitry from the conductive state to a non-conductive state after the change of operation of the switching circuitry from the conductive state to the non-conductive state.

8. The circuit breaker of claim 1 wherein the mechanical breaker circuitry and the switching circuitry are coupled in parallel with one another between the input node and the output node.

9. The circuit breaker of claim 8 further comprising control circuitry configured to change the operation of the mechanical breaker circuitry from the conductive state to the non-conductive state at a zero-crossing of the AC waveform.

10. The circuit breaker of claim 1 wherein the energy absorption circuitry is configured to establish a counter voltage to dissipate the electrical energy of the fault.

11. The circuit breaker of claim 1 wherein the energy absorption circuitry comprises a metal oxide varistor.

12. The circuit breaker of claim 1 further comprising a fault current limiter coupled between the input node and each of the mechanical breaker circuit, the switching circuitry and the energy absorption circuitry.

13. The circuit breaker of claim 1 wherein the changing of each of the mechanical breaker circuitry and the switching circuitry to the respective non-conductive states and the dissipation of the electrical energy by the energy absorption circuitry interrupt the fault within one cycle of the AC waveform following detection of the fault.

14. The circuit breaker of claim 1 wherein the AC waveform has a voltage in excess of 1,200 Volts at different moments in time.

15. A circuit breaker comprising:
- an input node configured to receive an AC waveform of electrical energy into the circuit breaker;
- an output node configured to output an AC waveform from the circuit breaker;
- a mechanical breaker circuitry coupled with the input node and the output node, and wherein the mechanical breaker circuitry is configured to selectively operate in a conductive state to conduct the AC waveform from the input node to the output node;
- switching circuitry coupled with the input node and the output node, and wherein the switching circuitry is configured to selectively operate in a conductive state to conduct the AC waveform from the input node to the output node and to selectively operate in a non-conductive state after detection of a fault; and
- energy storage circuitry configured to store electrical energy and to discharge the stored electrical energy to the switching circuitry to reduce an amplitude of a current of the fault.

16. The circuit breaker of claim 15 wherein the energy storage circuitry comprises at least one capacitor coupled in series with an inductor.

17. The circuit breaker of claim 15 wherein the discharge of the electrical energy results in the injection of a current that is reverse of the current of the fault.

18. The circuit breaker of claim 15 further comprising energy absorption circuitry coupled with the input node and the output node, and wherein the energy absorption circuitry is configured to dissipate electrical energy of the fault after the operation of the switching circuitry is provided in the non-conductive state.

19. The circuit breaker of claim 15 further comprising control circuitry configured to control the switching circuitry to change from the operation in the conductive state to operation in the non-conductive state after the detection of the fault.

20. The circuit breaker of claim 19 wherein the control circuitry is configured to control the switching circuitry to change from the operation in the conductive state to operation in the non-conductive state after controlling the mechanical breaker circuitry to change from the operation in the conductive state to operation in a non-conductive state.

21. The circuit breaker of claim 19 wherein the control circuitry is configured to control the mechanical breaker circuitry to change from the operation in the conductive state to operation in a non-conductive state after controlling the switching circuitry to change from the operation in the conductive state to the operation in the non-conductive state.

22. The circuit breaker of claim 15 wherein the AC waveform has a voltage in excess of 1,200 Volts at different moments in time.

23. A circuit breaker comprising:
- an input node configured to receive an AC waveform of electrical energy into the circuit breaker;
- an output node configured to output an AC waveform from the circuit breaker;
- a mechanical breaker circuitry coupled with the input node and the output node, and wherein the mechanical breaker circuitry is configured to selectively operate in a conductive state to conduct the AC waveform from the input node to the output node;
- switching circuitry coupled with the input node and the output node, and wherein the switching circuitry is configured to selectively operate in a conductive state to conduct the AC waveform from the input node to the output node; and
- control circuitry configured to control the mechanical breaker circuitry to change from the operation in the conductive state to operation in a non-conductive state after detection of a fault and at a zero-crossing of the AC waveform.

24. The circuit breaker of claim 23 further comprising energy absorption circuitry coupled with the input node and the output node, and wherein the energy absorption circuitry is configured to dissipate electrical energy of the fault after the operation of the mechanical breaker circuitry has been changed to the non-conductive state.

25. The circuit breaker of claim 23 wherein the control circuitry is configured to control the switching circuitry to change from operation in the conductive state to operation in a non-conductive state after the detection of the fault.

26. The circuit breaker of claim 23 wherein the control circuitry is configured to control the switching circuitry to change from operation in the conductive state to operation in a non-conductive state to provide the zero-crossing of the AC waveform.

27. The circuit breaker of claim 23 wherein the AC waveform has a voltage in excess of 1,200 Volts at different moments in time.

28. A circuit breaker operational method comprising:
- receiving an AC waveform of electrical energy within a circuit breaker via an input node of the circuit breaker;
- conducting the AC waveform from the input node to an output node of the circuit breaker using the circuit breaker;
- detecting a fault during the conducting;
- after the detecting, changing operation of mechanical breaker circuitry of the circuit breaker that is coupled with the input node and the output node from a conductive state to a non-conductive state;
- after the detecting, changing operation of switching circuitry of the circuit breaker that is coupled with the input node and the output node from a conductive state to a non-conductive state;
- absorbing electrical energy of the fault using energy absorption circuitry of the circuit breaker after the changings of the operations of the mechanical breaker circuitry and the switching circuitry to the non-conductive state; and
- wherein the conducting comprising conducting the AC waveform having a voltage in excess of 1,200 Volts at different moments in time.

29. The method of claim 28 wherein the changing operation of the switching circuitry occurs prior to the changing operation of the mechanical breaker circuit.

30. A circuit breaker operational method comprising:
- receiving an AC waveform of electrical energy within a circuit breaker via an input node of the circuit breaker;
- conducting the AC waveform from the input node to an output node of the circuit breaker using the circuit breaker;
- detecting a fault during the conducting;
- after the detecting, changing operation of mechanical breaker circuitry of the circuit breaker that is coupled with the input node and the output node from a conductive state to a non-conductive state;

after the detecting, changing operation of switching circuitry of the circuit breaker that is coupled with the input node and the output node from a conductive state to a non-conductive state;

absorbing electrical energy of the fault using energy absorption circuitry of the circuit breaker after the changings of the operations of the mechanical breaker circuitry and the switching circuitry to the non-conductive state; and wherein the changing operation of the mechanical breaker circuitry occurs prior to the changing operation of the switching circuitry.

31. A circuit breaker operational method comprising:

receiving an AC waveform of electrical energy within a circuit breaker via an input node of the circuit breaker;

conducting the AC waveform from the input node to an output node of the circuit breaker using the circuit breaker;

detecting a fault during the conducting;

after the detecting, changing operation of mechanical breaker circuitry of the circuit breaker that is coupled with the input node and the output node from a conductive state to a non-conductive state;

after the detecting, changing operation of switching circuitry of the circuit breaker that is coupled with the input node and the output node from a conductive state to a non-conductive state;

absorbing electrical energy of the fault using energy absorption circuitry of the circuit breaker after the changings of the operations of the mechanical breaker circuitry and the switching circuitry to the non-conductive state; and after the detecting, discharging electrical energy from energy storage circuitry to inject current that is reverse of a current of the fault.

32. The method of claim 31 further comprising charging the energy storage circuitry during an absence of the fault.

33. A circuit breaker operational method comprising:

receiving an AC waveform of electrical energy within a circuit breaker via an input node of the circuit breaker;

conducting the AC waveform from the input node to an output node of the circuit breaker using the circuit breaker;

detecting a fault during the conducting;

after the detecting, changing operation of mechanical breaker circuitry of the circuit breaker that is coupled with the input node and the output node from a conductive state to a non-conductive state;

after the detecting, changing operation of switching circuitry of the circuit breaker that is coupled with the input node and the output node from a conductive state to a non-conductive state;

absorbing electrical energy of the fault using energy absorption circuitry of the circuit breaker after the changings of the operations of the mechanical breaker circuitry and the switching circuitry to the non-conductive state; and wherein the changing operation of the mechanical breaker circuitry comprises changing at a zero-crossing of the AC waveform.

34. The method of claim 33 further comprising controlling the changing operation of the switching circuitry after the detecting to provide the zero-crossing of the AC waveform.

* * * * *